Aug. 15, 1944. J. A. FORBES 2,355,720
BRAKE
Filed Jan. 14, 1943 2 Sheets-Sheet 1

INVENTOR.
JOSEPH A. FORBES
BY
ATTORNEYS

Aug. 15, 1944.   J. A. FORBES   2,355,720
BRAKE
Filed Jan. 14, 1943   2 Sheets-Sheet 2

*INVENTOR.*
JOSEPH A. FORBES
BY
*Whittemore Hulbert & Belknap.*
ATTORNEYS

Patented Aug. 15, 1944

2,355,720

UNITED STATES PATENT OFFICE 2,355,720

BRAKE

Joseph A. Forbes, Detroit, Mich., assignor to John Sneed, Royal Oak, Mich.

Application January 14, 1943, Serial No. 472,381

5 Claims. (Cl. 188—79.5)

The invention relates to brakes and refers more particularly to brakes of that type having brake members relatively movable axially toward each other to apply the brake.

The invention has for one object to provide an improved brake of the above type having automatically adjustable means for normally maintaining a predetermined clearance between the brake members.

The invention has for another of its objects to so construct the brake that its automatically adjustable part for normally maintaining the predetermined clearance is subject to but very little friction while being adjusted.

Figure 1:
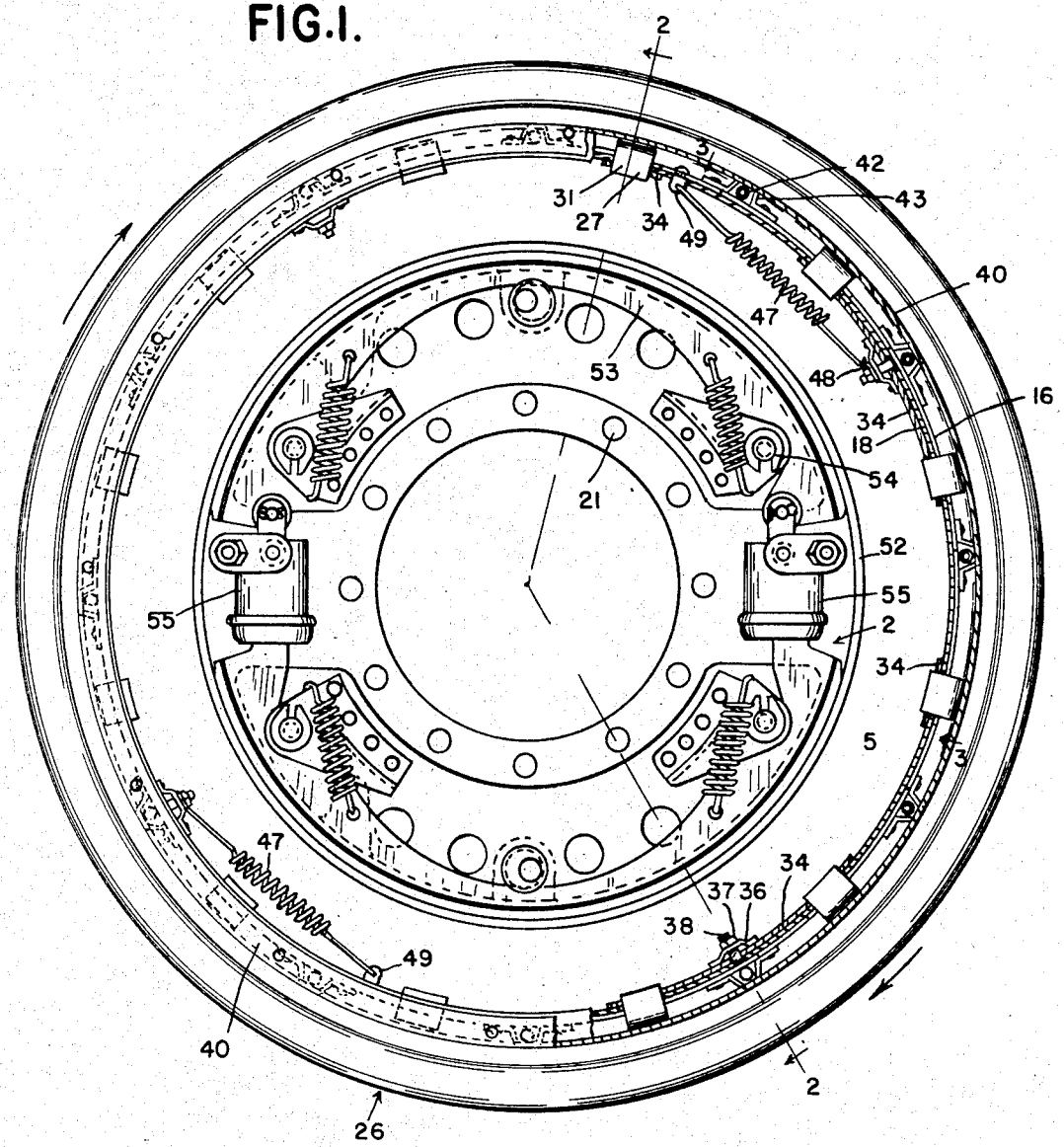
Figure 2:
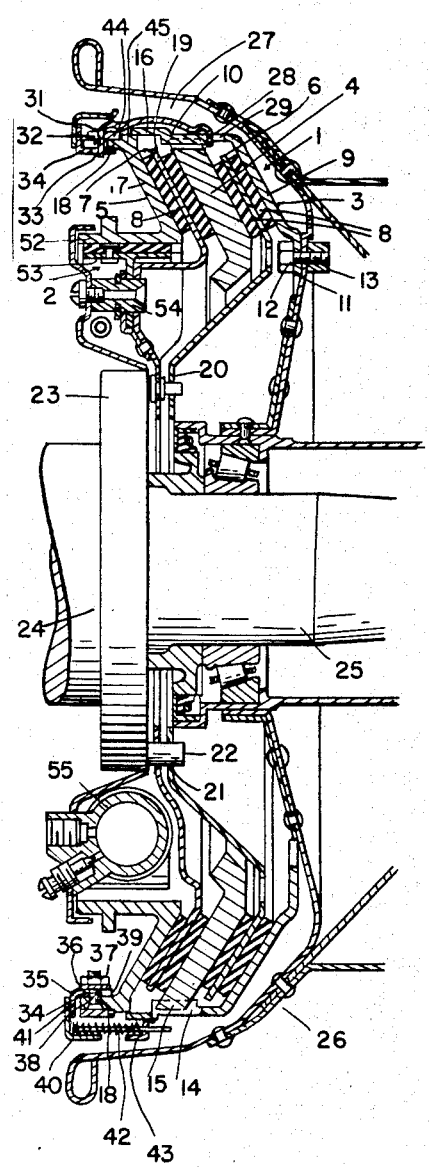
Figure 3:
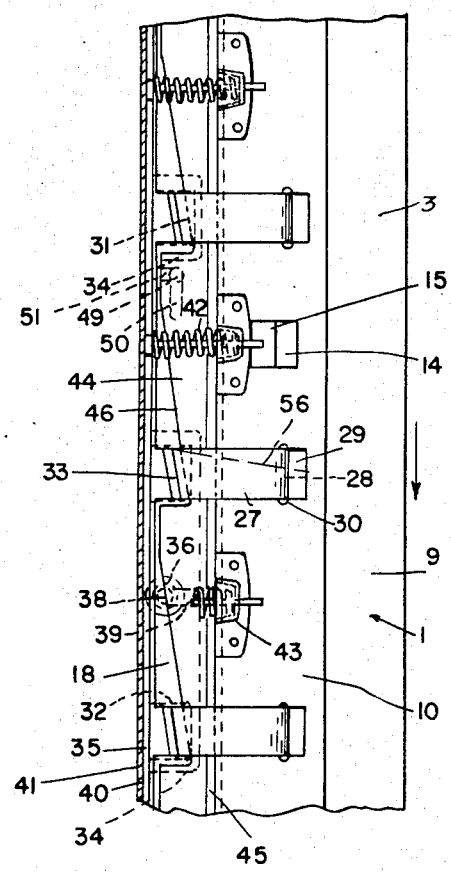

These and other objects of the invention will become apparent from the following description, taken in connection with the accompanying drawings, in which Figure 1 is an inboard elevation partially broken away and in section of a brake embodying the invention;

Figures 2 and 3 are cross sections on the lines 2—2 and 3—3, respectively, of Figure 1.

As illustrated in the present instance the brake is applied to an airplane landing wheel, although it is apparent that it may be otherwise used as with motor vehicle wheels. The brake comprises the main brake mechanism 1 and the pilot brake mechanism 2 for applying the main brake mechanism.

The main brake mechanism comprises the rotatable outboard, intermediate and inboard friction elements or brake members 3, 4 and 5, respectively, and the non-rotatable outboard and inboard friction elements or brake members 6 and 7, respectively, which preferably have secured to their opposite sides the brake linings 8. The rotatable outboard brake member 3 is cup-shaped and has the frusto-conical disc portion 9, the annular wall 10 extending in an inboard direction from the outer edge of the disc portion and the radial back 11 at the inner edge of the disc portion, the latter being suitably secured to the landing wheel as by means of the bolts 12 and the nuts 13. The annular wall 10 is formed with the axially extending openings 14 into which project radial projections 15 at the outer edge of the rotatable intermediate brake member 4. The annular wall 10 is also formed with the enlargement 16 which is located in an inboard direction from the openings 14 and encircles and pilots the rotatable inboard brake member 5. The rotatable intermediate brake member 4 is in the nature of a frusto-conical disc. The rotatable inboard brake member 5 has the frusto-conical disc portion 17 and the axially extending flange 18 extending in an inboard direction from the outer edge of the disc portion. The non-rotatable outboard and inboard brake members 6 and 7, respectively, are in the nature of discs having frusto-conical disc portions 19 to which the linings 8 are secured and the substantially radial central portions 20, each of which latter is formed with an annular series of holes 21 for slidably engaging the studs 22 which extend in an outboard direction from the radial flange 23 of the support 24 having the shaft 25 on which is journaled the airplane landing wheel 26.

27 are channel-shaped links, preferably formed of spring steel, operatively connecting the rotatable outboard and inboard brake members 3 and 5, respectively. The links extend substantially axially in the normal or off positions of the parts and are angularly spaced at equal distances from each other about the annular wall 10 of the rotatable outboard brake member 3 and the axially extending flange 18 of the rotatable inboard brake member 5. Each link is provided at its outboard end with the radially inwardly extending portion 28, which extends through an opening 29 in the annular wall 10 and abuts the inboard end of the opening. The portion 28 is formed with the lateral projections 30 which extend circumferentially inside the annular wall 10 beyond the openings 29 to thereby retain the outboard ends of the links from accidental disengagement from the annular wall. Each link is provided at its inboard end with the radially inwardly extending portion 31 which extends through the opening 32 in the axial flange 18 of the rotatable inboard brake member 5, the opening preferably being open in an inboard direction. The portion 31 also extends through the opening 33 in the axial flange 34 of the abutment ring 35. The axial flange 34 is one of an annular series of projections and extends within the axial flange 18. The abutment ring 35 is frictionally secured in place by the angularly spaced bowed springs 36 which frictionally abut the radially inner faces of different axial flanges 34 and are adjustably clamped in place by the nuts 37 threaded upon the bolts 38, which extend through the axial flanges 34 and 18 and preferably have heads located in countersinks in the radially outer faces of the axial flanges 18. The bolts 38 are angularly spaced at equal distances around the axial flange 18 and the openings 39 in the axial flanges 34 of the abutment ring through which the bolts pass preferably open in an outboard direction to permit the abutment ring to be assembled with the rotatable inboard brake member by a relative axial movement. 40 is a sheet metal annular guard having a radial flange secured to the radial flange 41 of the abutment ring by suitable means, such as screws. The guard has an axial flange which is radially outwardly spaced from the rotatable inboard brake member 5 and which also encircles the inboard end portions of the links 27 to hold the same from accidental disengagement. 42 are coil springs located circumferentially between the links 27 and having their opposite ends respectively connected to the rotatable outboard and inboard brake members 3 and 5, respectively, to resiliently hold the same in normal or off positions, at which time the links 27 extend axially. Each spring 42 at its inboard end abuts the radial flange of the annular guard 40 and at its outboard end abuts the web of a sheet metal clip 43 into which the outboard end of the spring extends. Each clip 43 is suitably secured to the annular wall 10 as by means of rivets.

44 is a cam ring encircling the axial flange 18 of the rotatable inboard brake member 5 and abutting the inboard side of the radially outwardly extending flange 45 of the rotatable inboard brake member. The cam ring is formed with the angularly spaced cams 46 at its inboard edge, there being one cam for each link 27. The portions 31 at the inboard ends of the links have the same inclination as the cams. The openings 33 in the axial flanges 34 of the abutment ring have their inboard ends formed with the same inclination as the portions 31 and the cams 46, while their outboard ends are formed to extend parallel to the radial flange 41 of the abutment ring. The distances between the inboard and outboard ends of the openings are predetermined for the purpose of securing predetermined clearance between the rotatable brake members and the non-rotatable brake members when in their normal or off positions and also for the purpose of securing a limited angular movement of the links during operation of the brake.

To resiliently urge the cam ring 44 circumferentially in a direction to maintain the cams 46 normally against the inboard portions 31 of the links 27 when the parts are in their normal or off positions, I have provided the diametrically opposite coil springs 47, each of which is connected at one end to the plate 48 secured to a bolt 38 and at the other end to the bracket 49 which is riveted to the cam ring between adjacent axial flanges 34 of the abutment ring and is slidable in the circumferentially extending slot 50 formed in the axial flange 18 of the rotatable inboard brake member. The axial flange 18 is also provided with a transverse slot 51 which leads from the inboard edge of the flange to the slot 50, the construction being such that the parts may be readily assembled by a relative axial movement.

The pilot brake mechanism 2 comprises the rotatable brake drum 52 and the friction element 53 engageable with the cylindrical radially inner friction face of the drum. The drum extends in an inboard direction from the radially inner edge of the rotatable inboard brake member 5 and is preferably integral therewith. The friction element 53 comprises brake shoes, which are carried by the non-rotatable inboard brake member 7. The shoes are adapted to be anchored by the anchor pins 54 which are secured to the non-rotatable inboard brake member 7 and the shoes are adapted to be actuated by the diametrically opposite fluid pressure operated actuators or wheel cylinders 55 which are positioned between and are carried by the end portions of the shoes.

Assuming the wheel 26 and the rotatable outboard brake member 3 to be rotating in the directions of the arrows of Figures 1 and 3, the rotatable intermediate brake member 4 is being rotated directly by the rotatable outboard brake member and the rotatable inboard brake member 5 is being rotated in unison with the rotatable outboard brake member by the links 27 and the coil springs 42 with the links extending axially. If the rotatable inboard brake member 5 is retarded by means of the pilot brake mechanism 2 through the application of the friction element 53 to the drum 52 the links 27 are compelled to move angularly or swing about the cam ring 44 as a fulcrum. These links compel the rotatable inboard brake member to move against the non-rotatable inboard brake member which in turn is moved against the rotatable intermediate brake member which is then moved against the non-rotatable outboard brake member, which latter is finally moved against the rotatable outboard brake member, completing the application of the main brake mechanism. If the angular positions of the links 27, as shown by the dotted line 56 in Figure 3, are such that the inboard portions 31 of the links contact the inboard ends of the openings 33 in the axial flanges 34 of the abutment ring the latter is moved in an inboard direction relative to the axial flange 18 of the rotatable inboard brake member 5. Then when the braking pressure exerted on the pilot brake mechanism is removed the bowed springs 36 serve to hold the abutment ring 35 in its adjusted position relative to the rotatable inboard brake member 5 and the coil springs 42 serve to move the abutment ring and the rotatable inboard brake member away from the rotatable outboard brake member 3 to a predetermined position as determined by the links 27 engaging the outboard ends of the openings 33 in the axial flanges of the abutment ring. As the pressure of the inboard portions 31 of the links 27 on the cams 46 of the cam ring is removed or sufficiently decreased, the coil springs 47 act on the cam ring 44 to circumferentially move the same in the direction of the arrows of Figures 1 and 3 to move its cams 46 against the inboard portions 31 of the links 27, there being but little friction opposing this movement of the cam ring. At this time the automatic brake adjustment is completed and a predetermined clearance is provided between the rotatable and non-rotatable brake members of the main brake mechanism. Also, the adjustment is such that the brake members of the main brake mechanism can be moved into braking engagement by the links 27 and cam ring 44 with the links having an angular or swinging movement within a predetermine angle to maintain the desired high operating efficiency.

What I claim as my invention is:

1. A brake comprising brake members relatively movable toward each other, a brake member between and engageable with said first mentioned brake members upon relative movement toward each other, and means for relatively moving said first mentioned brake members toward each other upon relative rotation thereof, comprising links and an automatically adjustable cam ring cooperating with said links to normally maintain a predetermined clearance between said first mentioned brake members and said second mentioned brake member.

2. A brake comprising rotatable brake members relatively movable toward each other, a non-rotatable brake member between and engageable with said first mentioned brake members upon relative movement toward each other, means comprising links and a cam ring for relatively moving said first mentioned brake members toward each other upon retardation of one of said first mentioned brake members, means comprising an abutment member and springs for relatively moving said first mentioned brake members away from each other, and spring means for adjustably positioning said cam ring relative to said links.

3. A brake comprising rotatable brake members relatively movable toward each other, a non-rotatable brake member between and engageable with said first mentioned brake members upon relative movement toward each other, means comprising a cam ring and links for relatively moving said first mentioned brake members toward each other upon retardation of one of said first mentioned brake members, an abutment ring adjustably secured to said one of said first mentioned brake members in a position predetermined by said links, yieldable members between said abutment ring and the other of said first mentioned brake members for relatively moving said first mentioned brake members away from each other, and spring means for yieldably positioning said cam ring relative to said links.

4. A brake comprising brake members relatively movable toward each other, a brake member between and engageable with said first mentioned brake members upon relative movement toward each other, means comprising links and a cam member for relatively moving said first mentioned brake members toward each other upon relative rotation thereof, means comprising an abutment member and spring means for relatively moving said first mentioned brake members away from each other, said abutment member being engageable by said links to predeterminedly position said abutment member on one of said first mentioned brake members, and means connected to said cam member for adjustably positioning the same relative to said links.

5. A brake comprising brake members relatively movable toward each other, a brake member between and engageable with said first mentioned brake members upon relative movement toward each other, means for relatively moving said first mentioned brake members toward each other upon relative rotation thereof, said means comprising links and cam means cooperating with said links, said cam means being adjustable to normally maintain a predetermined clearance between said first mentioned brake members and said second mentioned brake member, spring means for adjusting said cam means, and means for relieving said cam means from pressure by said links during adjustment of said cam means.

JOSEPH A. FORBES.